May 2, 1961     D. R. DE BOISBLANC     2,982,091

COMBUSTION CONTROL IN RAM JET AIRCRAFT ENGINES

Filed Dec. 21, 1956     2 Sheets-Sheet 1

INVENTOR.
D. R. DeBOISBLANC

BY Hudson & Young

ATTORNEYS

May 2, 1961  D. R. DE BOISBLANC  2,982,091
COMBUSTION CONTROL IN RAM JET AIRCRAFT ENGINES
Filed Dec. 21, 1956  2 Sheets-Sheet 2

INVENTOR.
D. R. DeBOISBLANC
BY *Hudson & Young*
ATTORNEYS

United States Patent Office 2,982,091
Patented May 2, 1961

2,982,091
COMBUSTION CONTROL IN RAM JET AIRCRAFT ENGINES

Deslonde R. de Boisblanc, Idaho Falls, Idaho, assignor to Phillips Petroleum Company, a corporation of Delaware Filed Dec. 21, 1956, Ser. No. 629,829
2 Claims. (Cl. 60—35.6)

This invention relates to control systems for regulating combustion in ram jet aircraft engines.

This application is a continuation-in-part of copending application Serial No. 220,114, filed April 9, 1951, now Patent No. 2,799,136.

In various types of aircraft engines, considerable difficulty has been encountered in attempting to maintain combustion at a desired rate in the combustion chamber. This is particularly true in a ram jet type engine. A ram jet aircraft engine is a form of reaction motor which depends for compression pressure entirely on the conversion of the kinetic energy of impinging air into pressure head. Air enters the front of the engine through a diffuser which provides the desired compression. Fuel is injected into the compressed air and burns downstream in a combustion region which is stabilized by a flame holder. The heated gases are exhausted through a discharge nozzle to provide propulsion.

In engines of this type, it is important to regulate the fuel-air ratio so that combustion is maintained within the combustion chamber. If the fuel-air mixture should become too rich, for example, there may be a tendency for flame to flash back into the region behind the flame holder. This can result in damage to the engine and in a substantial reduction of power output. In accordance with the present invention, a combustion control system is provided for a ram jet engine to prevent this condition of flame flash-back. A flame detecting element is positioned in a region upstream from the flame holder. This detector provides a signal representative of flame impinging thereon which actuates a servo system to adjust the operation of the engine to eliminate the flash-back. This control can be accomplished by adjusting the ratio of fuel to air supplied to the combustion chamber or by adjusting the velocity of the fuel-air mixture supplied to the combustion chamber.

Accordingly, it is an object of this invention to provide a control system for regulating combustion in ram jet aircraft engines.

Another object is to provide a control system for preventing flash-back of flame behind the flame holder of an aircraft engine.

Other objects, advantages and features of this invention should become apparent from the following detailed description which is taken in conjunction with the accompanying drawing in which.

Figure 1:
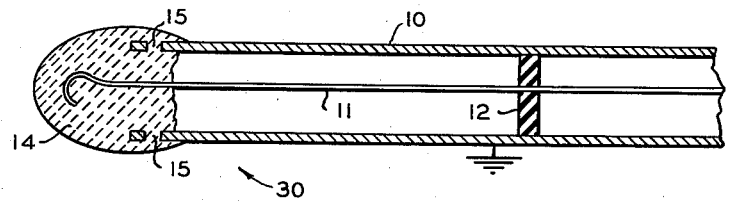
Figure 1 is a cross-sectional view of a flame detecting element which can be employed to advantage in the control system of this invention.

Referring now to the drawing in detail and to Figure 1 in particular, there is shown a sensing probe which can be employed effectively to indicate the presence of flame. This probe comprises a metallic casing 10 which has a metallic electrode 11 positioned therein and electrically insulated from casing 10 by means of supports, such as 12. Electrode 11 is embedded within a tip 14 of a ceramic material which is disposed across one end of casing 10 and which makes electrical contact therewith. Ceramic tip 14 preferably is constructed of some type of refractory material, such as aluminum oxide, which can be formed in a paste by mixing powdered aluminum oxide with water. The paste is molded in a form of a tip across the end of casing 10 and then sintered. This ceramic probe can be of the type more fully disclosed in U.S. Patent 2,768,266.

It has been found that in an electrical resistance element, such as tip 14, there normally exists a substantially constant distribution of potential at all points through the element. If a charged particle, such as ions which are produced by the reaction of a flame, impinges upon the surface of this resistance element, the constant potential conditions is disrupted so that current flows through the element until all points are again at a common potential. During the time the current is flowing, the region of resistance element in the neighborhood of electrode 10 exhibits a potential variation with respect to the reference electrode 10 which depends upon the magnitude of the charge to the particle striking the element, the resistance of the element, and the geometric relationship of electrode 11 with respect to electrode 10. This potential variation can be amplified to provide a detectable electrical signal which is representative of flame impinging upon tip 14. A flame detector of this type can be employed to advantage in aircraft engines because the tip is capable of withstanding the high temperatures which normally are encountered in such engines. The probe responds solely to flame, not to high temperatures alone. Casing 10 can be formed of stainless steel or other materials which are capable of withstanding high temperatures.

Figure 2:
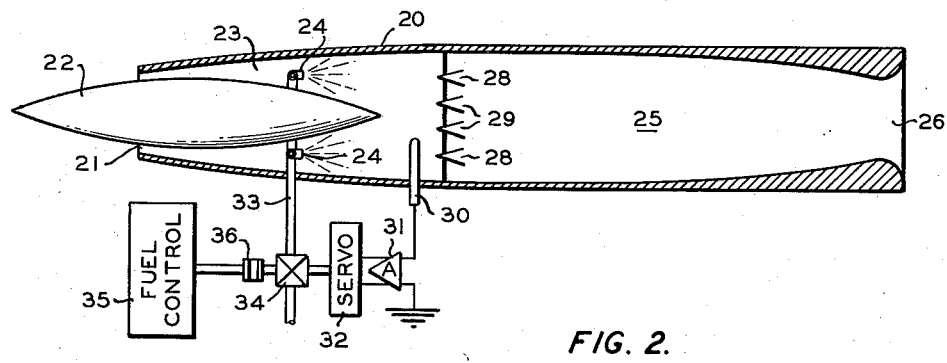
Figure 2 is a schematic representation of a first embodiment of the control system of this invention.

In Figure 2, there is shown a first embodiment of the ram jet aircraft engine control system of this invention. Atmospheric air enters casing 20 of the engine through an opening 21 which is located between casing 20 and a bullet type air plug 22 that is disposed therein. The air passes through a diffuser section 23 and past fuel nozzles 24 which are located annularly about plug 22. The resulting fuel-air mixture passes into a combustion chamber 25, and the heated gases are exhausted through a discharge nozzle 26 to provide thrust. Since large quantities of fuel must be burned efficiently in a small space without excessive pressure drop, flame holders 28 and 29 are provided. These flame holders can be in the form of V-shaped rings which are disposed within casing 20. The ends of the rings normally are provided with small openings through which the combustible mixture passes. Within these rings, the velocity of the fuel-air mixture is relatively low so that combustion readily takes place. Thus, combustion normally takes place in region 25 as long as the fuel-air mixture retains the desired ratio and velocity as determined by the design of the particular engine.

However, if the fuel-air ratio should vary appreciably from its proper value, there is the danger of what is known as "flash-back." Flash-back is the condition of combustion taking place behind flame holders 28 and 29. This condition can result, for example, if the fuel-air mixture becomes too rich so that flame is propagated backwardly behind the fuel nozzles. Such a condition greatly reduces the power output of the engine and should be avoided. Since this flash-back indicates that the fuel-air ratio no longer has the desired value, means are provided for adjusting the fuel-air ratio to restore proper combustion. In order to provide this control, a flame sensing probe 30 is disposed within casing 20 at a region behind the flame holders. The output signal from probe 30 is amplified by an amplifier 31 and energizes a servo control system 32. In the control system illustrated in Figure 2, fuel is supplied to nozzles 24 through a conduit 33 which has a control valve 34 therein. The flow through conduit 33 normally is adjusted by a throttle fuel control 35 which adjusts valve 34 through a friction clutch 36. This throttle provides the entire control of the fuel supply as long as flame is not detected in the region behind the flame holders. However, if flame is detected by probe 30, the resulting output signal actuates servo system 32 to override the normal fuel control and reset valve 34 to prevent the flash-back. This control step is performed by reducing the amount of fuel supplied to the engine.

Figure 3:
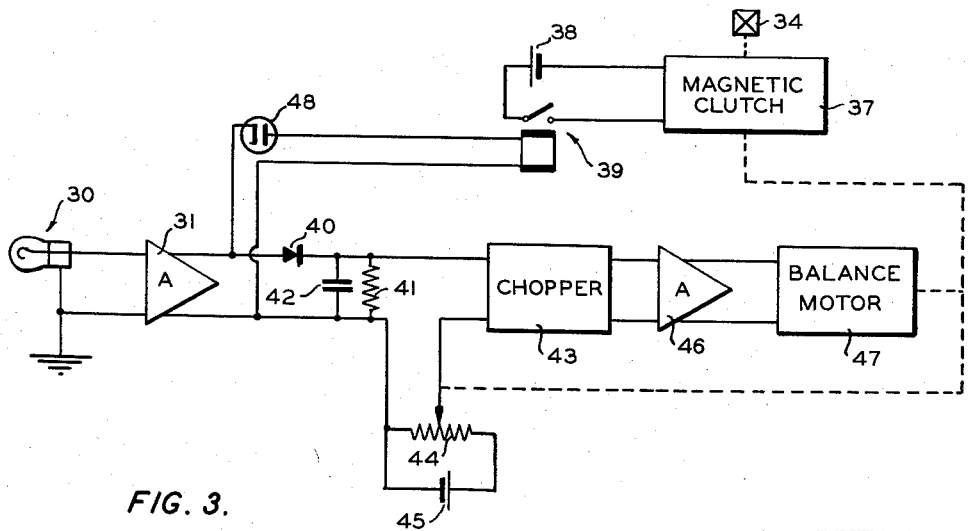
Figure 3 is a schematic circuit diagram of the servo system of Figure 2.

In Figure 3, there is shown a schematic circuit drawing of a suitable servo control system. The first output terminal of amplifier 31 is connected through a rectifier 40 to the first terminal of a resistor 41. The second output terminal of amplifier 31 is connected to the second end terminal of resistor 41. A filter capacitor 42 is connected in parallel with resistor 41. The fluctuating output signal of amplifier 31 is thus rectified to provide a direct potential across resistor 41 which is representative of flame striking probe 30. This potential is connected in opposition to a reference potential, and the resulting potential difference is applied to a chopper circuit 43. The reference potential is supplied by a potentiometer 44 which has a voltage source 45 connected thereacross. Even in the absence of flame, there may be some background noise produced which results in a small potential across resistor 41. Potentiometer 44 is set to provide a reference potential of this value. Chopper 43 compares the two potentials and provides an output alternating signal of amplitude and phase representative of the difference between the two potentials. This signal is amplified by an alternating current amplifier 46 which energizes a balance motor 47. Motor 47 is mechanically connected to fuel control valve 34 through a magnetic clutch 37 and to the contactor of potentiometer 44. The balance motor thus adjusts valve 34 to reduce the fuel supplied to the engine to the extent required to eliminate flame in the region of probe 30. Motor 47 also adjusts the contactor of potentiometer 44 to restore a balanced condition in the circuit, as indicated by the two potentials being equal. This particular type of servo system is well known in the art and can be of the form described in detail in The Electron Control Handbook, Batcher and Moulic, Caldwell-Clements, Inc., New York (1946), page 298. Clutch 37 is actuated by a current source 38 which is connected thereto through a relay 39. Relay 39 is connected through a diode 48 to the output of amplifier 31. Thus, motor 47 adjusts valve 34 only when the output of amplifier 31 is large enough to actuate relay 39. This occurs when flame is detected by probe 30. After the fuel rate has been adjusted to eliminate flame, the potential supplied by potentiometer is greater than the potential across resistor 41. Balance motor 47 then reverses to restore the original condition. Valve 34 is not operated at this time because clutch 37 is not energized. The connection between motor 47 and potentiometer 44 actually is not needed in the system of Figure 3, but is valuable in the systems of Figures 4 and 6.

Figure 4:
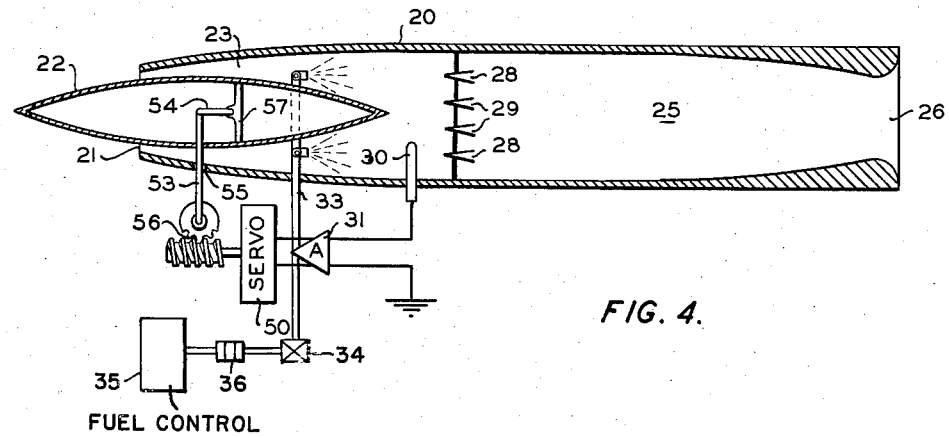
Figure 4 is a schematic representation of a second embodiment of the control system of this invention.

In Figure 4 there is shown a second ram jet engine which is similar in construction to the engine shown in Figure 2 and wherein like parts are designated by like reference numerals. Probe 30 of Figure 4 performs the same function as does probe 30 in Figure 2. However, in Figure 4 the fuel-air ratio is corrected by varying the input air to the engine rather than the input fuel. This correction is accomplished by moving plug 22 longitudinally with respect to engine casing 20 so as to vary the size of the air inlet opening 21. Suitable means for accomplishing this movement include a servo system 50 which is actuated by the output of amplifier 31, the input of which comprises electrical voltage fluctuations generated by flame impinging upon probe 30. Servo system 50 drives a lever 53 by worm gears 56, said lever 53 being hinged at a pivot point 55 on engine casing 50 and secured to plug 22 through rods 54 and 57. Rotation of lever 53 about pivot 55 adjusts the longitudinal position of plug 22 within casing 20 of the ram jet engine, thereby increasing or decreasing the size of air inlet openings 21 as may be required to properly adjust the fuel-air ratio in combustion chamber 25. If flash-back occurs, the servo system increases the size of the air opening. Following the correction, the plug moves back toward its original position as far as possible.

Figure 5:
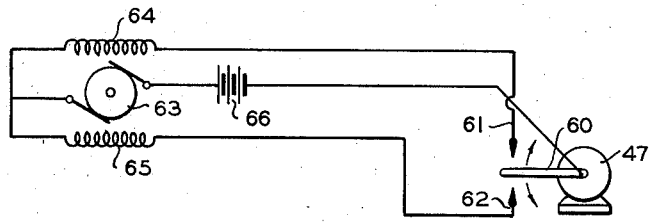
Figure 5 is a schematic circuit drawing of a modified form of servo system which is particularly adapted for use in the control system of Figure 4.

The control system of Figure 3 can be modified somewhat to provide suitable output power to perform the control step in the apparatus of Figure 4. Such a modified control system is illustrated schematically in Figure 5. A switch arm 60 is connected to balance motor 47 to rotate between spaced contacts 61 and 62. Clutch 37 is not employed in this particular embodiment. The output power is provided by a split field motor 63 which has windings 64 and 65. Energy from a source 66 is supplied to the two windings through arm 60 and respective contacts 61 and 62. Motor 63 is connected to worm gears 56. The system of Figure 5 thus forms a relay to supply a greater power output than can be delivered by a conventional servo balance motor.

Figure 6:
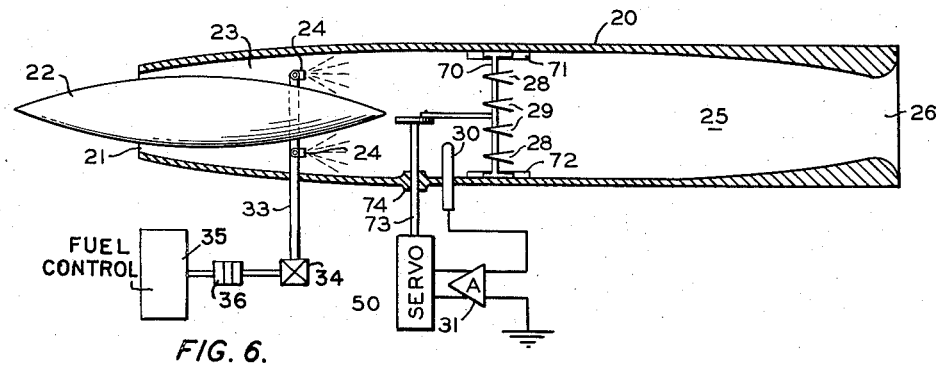
Figure 6 is a third embodiment of the control system of this invention.

A third embodiment of the control system of this invention is illustrated in Figure 6. Flame holders 28 and 29 are mounted on a frame 70 which extends between slide supports 71 and 72. The servo system 50 rotates a rod 73 which extends into casing 20 through a flange 74. A rod 75 extends between frame 70 and a cam 76 which is carried by rod 73. Rotation of rod 73 thus moves the flame holders longitudinally of the axis of the engine. This effectively changes the velocity of the fuel-air mixture past the flame holders because the cross-sectional area of casing 20 decreases toward inlet 21. Flash-back can occur if the velocity of the fuel-air mixture decreases below a predetermined value. This is then corrected by the servo system, shown in Figure 5, which moves the flame holders toward opening 21. The fuel-air mixture moves more rapidly at this region because of the smaller cross-sectional area.

From the foregoing description it should be apparent that there is provided in accordance with this invention an improved combustion control system for ram jet aircraft engines. This control system effectively eliminates the problem of flame flash-back behind the flame holders.

While the invention has been described in conjunction with present preferred embodiments, it should be evident that it is not limited thereto.

What is claimed is:

1. A control system for a ram jet engine, which includes an air intake diffuser, a flame holder positioned rearwardly of said diffuser, a discharge nozzle positioned rearwardly of said flame holder, and means to introduce fuel at a region upstream from said flame holder, comprising flame sensing means positioned between said flame holder and said region, and means responsive to flame impingement on said flame sensing means to regulate the position of the flame holder longitudinally of the axis of the engine to prevent flame from impinging on said flame sensing means.

2. A control system for a ram jet engine which includes an air intake diffuser, a flame holder positioned rearwardly of said diffuser, a discharge nozzle positioned rearwardly of said flame holder, and a fuel nozzle positioned forwardly of said flame holder, comprising means to pass fuel to said fuel nozzle, means to regulate the rate of fuel flow to said fuel nozzle, flame sensing means positioned between said fuel nozzle and said flame holder, and means responsive to flame impingement on said flame sensing means to regulate the position of the flame holder longitudinally of the axis of the engine to prevent flame from impinging on said flame sensing means.

References Cited in the file of this patent

UNITED STATES PATENTS

| | | |
|---|---|---|
| 2,501,633 | Price | Mar. 21, 1950 |
| 2,538,642 | Gardiner et al. | Jan. 16, 1951 |
| 2,540,594 | Price | Feb. 6, 1951 |
| 2,557,883 | Miller | June 19, 1951 |
| 2,570,629 | Anxionnaz et al. | Oct. 9, 1951 |
| 2,707,372 | Cleveland | May 3, 1955 |
| 2,742,756 | De Boisblanc | Apr. 24, 1956 |
| 2,771,740 | Johnson | Nov. 27, 1956 |